UNITED STATES PATENT OFFICE.

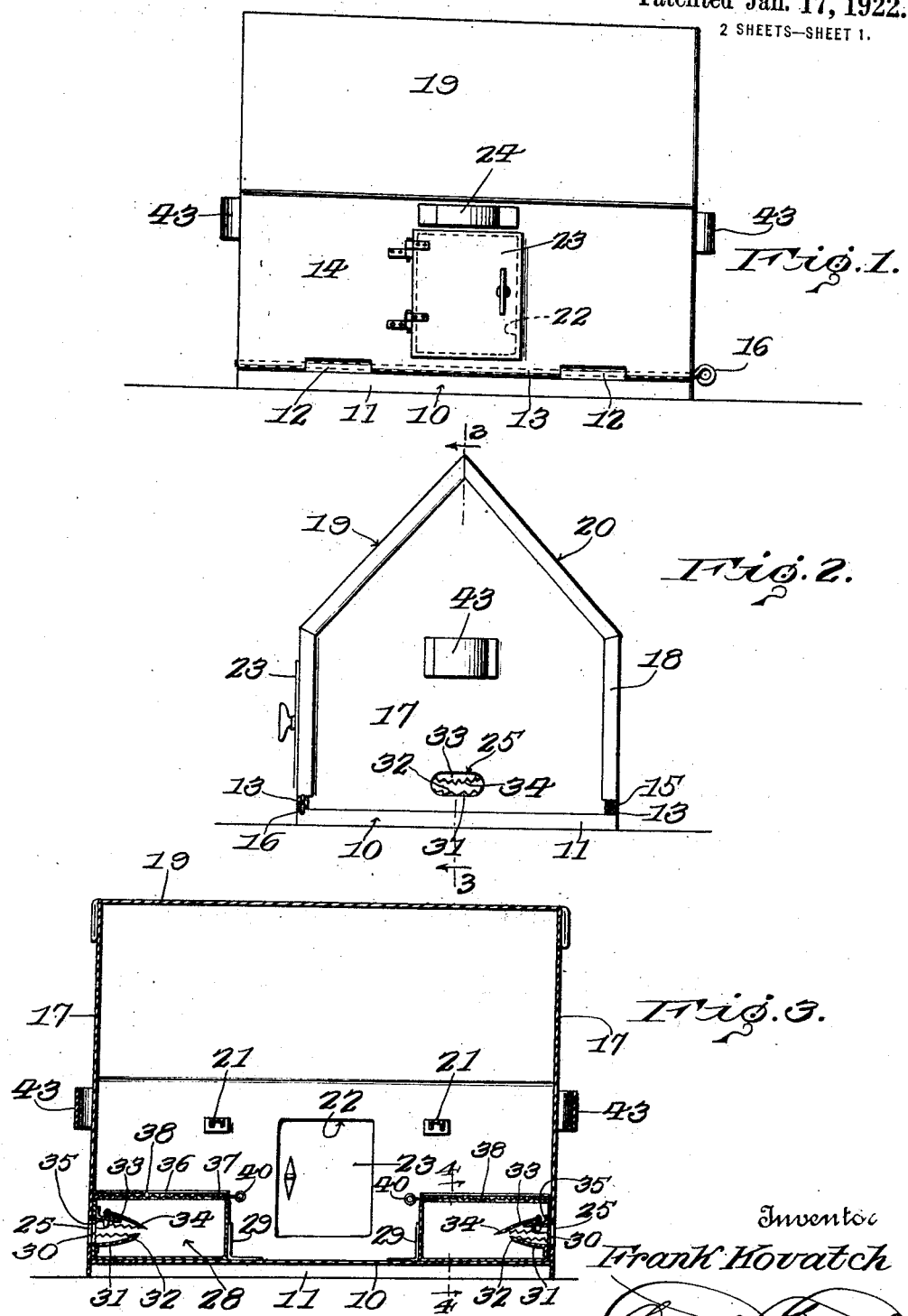

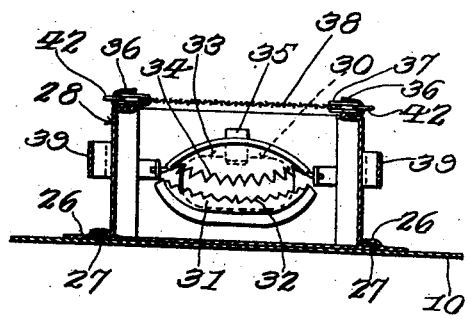
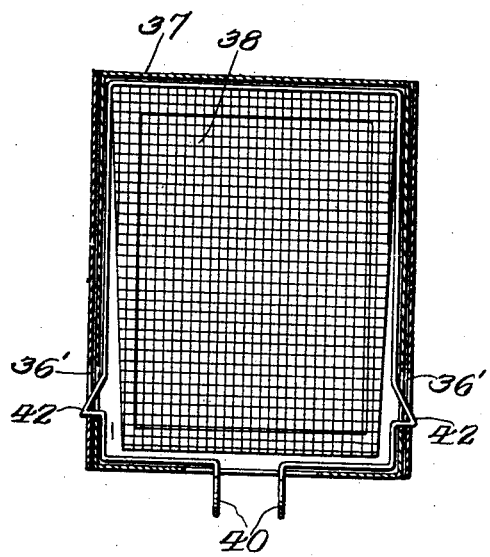
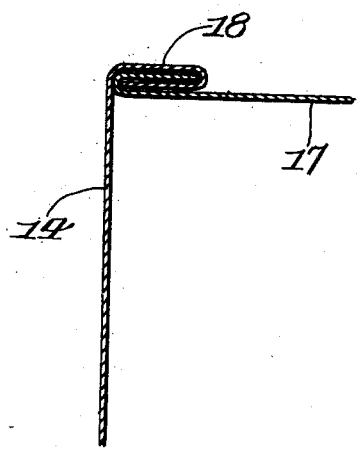
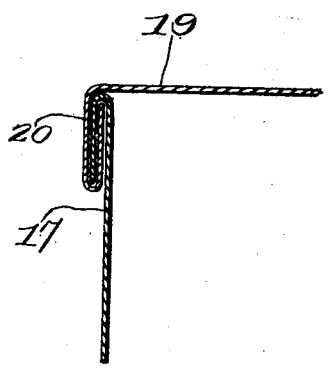

FRANK KOVATCH, OF OMAHA, NEBRASKA.

COMBINED COOP AND TRAP.

1,404,153.  Specification of Letters Patent.  Patented Jan. 17, 1922.

Application filed August 25, 1921. Serial No. 495,256.

*To all whom it may concern:*

Be it known that I, FRANK KOVATCH, a citizen of the United States, residing at Omaha, in the county of Douglas, State of Nebraska, have invented certain new and useful Improvements in Combined Coops and Traps; and I do hereby declare the following to be a full, clear, and exact description of the invention, such as will enable others skilled in the art to which it appertains to make and use the same.

This invention relates to new and useful improvements in poultry coops and rat and mouse traps.

One object of the invention is to provide a device of this character which is an improvement over my prior Patent 1,064,347, issued June 10, 1913, with a view to rendering the coop more easily cleaned.

Another object is to so improve the coop that it is stronger and more durable than the patented one, and wherein the mouse and rat trapping chambers can be more easily and quickly removed to dispose of the trapped animals.

A further object is to provide a combined coop and trap of this character which is simple in construction, cheap to manufacture, and which can be easily handled.

Other objects and advantages will be apparent from the following description when taken in connection with the accompanying drawing.

In the drawing:

Figure 1 is a side elevation of the combined coop and trap.

Figure 2 is an end view of the same.

Figure 3 is a vertical longitudinal central sectional view on the line 3—3 of Figure 2.

Figure 4 is a vertical transverse sectional view on the line 4—4 of Figure 3, passing through one of the animal trapping chambers or boxes, and the retaining means therefor.

Figure 5 is an enlarged horizontal sectional view through one of the trapping box covers.

Figure 6 is a sectional detail of the connection between the side and end wall of the coop.

Figure 7 is a sectional detail of the connection between the roof and the end wall of the coop.

Referring particularly to the accompanying drawings, 10 represents a metal base or floor with its marginal edges folded downwardly and inwardly to form the supporting flanges 11 therefor. Struck up from the opposite longer sides of the floor are the longitudinally extending tubular members 12 which enter between similar tubular members 13 formed on the lower edge portions of the side walls 14 of the upper portion of the coop. Rods 15 and 16 are removably disposed through these tubular members 12 and 13, to retain the upper portion of the coop in position on the floor. One of these rods is removable so that the upper portion may be swung back, on the other rod and tubular portions as a hinge, to permit access to the interior of the coop, as will be more clearly explained hereinafter.

The side walls 14, and the end walls 17, of the upper portion of the coop are connected by the folded lap seams 18, while the ends of the roof 19 are joined with the upper ends of the end walls 17 by similar seams 20, thus producing a water-tight structure. Extending between, and connected at their ends to the side walls 14, are the perch rods 21. An entrance opening 22 is formed on one of the side walls 14, which is closed by the door 23, and through this opening the chickens enter and leave the coop. A handle 24 is mounted on the side wall of the coop, just above the opening 22, which is adapted to be grasped to swing the upper portion of the coop away from the floor 10, for the purpose of permitting the floor to be cleaned.

In the lower central portion of each end wall 17 there is formed a horizontal elongated opening 25, through which mice or rats may enter the coop.

Secured to the upper face of the floor 10, adjacent each end thereof, and arranged in parallel pairs, are the metal strips 26, the same being offset upwardly from the upper face of the floor to receive thereunder the horizontal flanges 27 formed on the lower portions of the longer sides of the metal boxes 28. A stop 29 is also secured to the floor 10, against which the inner end of the box engages to limit its inward movement, and to maintain its outer end wall in close contact with the inner face of the end wall 17 of the coop. In the said end wall of the box there is formed an opening 30 of a size equal to the opening 25 and registering with said opening through which the rat or mouse may enter the box. Secured to each wall 17 below the lower wall of the opening 30 is an inwardly and upwardly extending flange 31, the inner end of which is formed with teeth 32. Pivotally supported on the said end wall of the box, above the opening 30, is a similarly shaped member 33, the inner end of which is formed with teeth 34 which extend inwardly and downwardly beyond the inner ends of the teeth 32. A finger 35 is mounted above the opening 30 and projects inwardly to engage with and support the pivoted member 33 out of contact with the member 31, and thus form an opening between the toothed members to entice the animal into the trap box. The upper edges of the longer sides of the box 28 are formed with the inwardly directed longitudinal flanges 36 beneath which the frame 37 of the screen cover 38 is arranged to slide, and be retained in position over the upper open portion of the box. Handles 39 are mounted on the sides of each box 28 to be grasped to pull the box from engagement with the metal strips 26, when it is desired to remove the box for disposing of the animal which has been trapped therein.

In each of the flanges 36 there is formed an opening 36'. Secured within the frame of the cover of the box is a wire 40 the ends of which extend through the inner end member of the frame and are formed with eyes 41 to receive the fingers of the operator for the purpose of flexing the said wire inward to release the outwardly projecting portions 42, which are received in the before-mentioned openings 36', and permit the cover to be slipped from engagement with the flanges 36.

It will be noted that the upper pivoted member 33 is transversely curved so that when swung upwardly by the entering animal, it will not permit itself to move sufficiently far to lie against the end wall of box 28, thus insuring the falling of the member onto the finger 35 and remaining in proper spaced relation to the lower toothed member 31.

The above-described structure provides for the trapping of mice and rats which attempt to enter the coop to attack the chickens. The openings in the end walls of the coop serve to entice the animals to enter the coop, with the result that they are trapped. By removing the removable rod 15, and grasping the handle 24, the upper part of the coop may be readily swung away from the floor 10, thus permitting the operator to easily slide the trapping chambers of boxes 28 from the coop, and destroy the trapped animal. Also, after having removed the boxes 28, the floor 10 can be properly and effectively cleaned.

The sides of the coop are formed integrally with the roof, the ends of the roof and the ends of the side walls being properly secured to the corresponding edge portions of the end walls, as clearly shown in the drawings, in Figures 6 and 7.

Carried by the ends of the coop are the handles 43, which are adapted to be grasped when the housing is to be lifted for the purpose of gaining access to the trapping chambers therein.

What is claimed is:

A combined coop and trap comprising a floor, boxes having lateral flanges, retaining guides on the floor receiving said flanges therebeneath to retain the boxes in position, the outer end of each box having an access opening, a toothed member mounted stationarily on the said outer end of the box and having a toothed end projecting into the box below the opening thereof, a movable toothed member mounted above said opening and supported normally out of contact with the first toothed member, flanges on the upper portions of the box, a reticulated cover plate engaged beneath the said flanges, said flanges having openings therein, a resilient detent carried by the cover plate and releasably engaged in the said openings, and an enclosure mounted on the floor to cover the boxes and provided with openings registering with the openings in the box ends.

In testimony whereof, I affix my signature, in the presence of two witnesses.

FRANK KOVATCH.

Witnesses:
GEO. C. PARDEE,
IRVIN A. STALMASTER.